United States Patent
Singh et al.

(10) Patent No.: US 12,457,378 B2
(45) Date of Patent: Oct. 28, 2025

(54) SYNCHRONIZED AUDIO STREAMS FOR LIVE BROADCASTS

(71) Applicant: MIXHalo Corp., San Francisco, CA (US)

(72) Inventors: Vikram Singh, San Francisco, CA (US); Ann Marie Simpson, San Francisco, CA (US)

(73) Assignee: Mixhalo Corp., San Francisco, CA (US)

( * ) Notice: Subject to any disclaimer, the term of this patent is extended or adjusted under 35 U.S.C. 154(b) by 93 days.

(21) Appl. No.: 18/137,242

(22) Filed: Apr. 20, 2023

(65) Prior Publication Data

US 2023/0353813 A1    Nov. 2, 2023

Related U.S. Application Data

(60) Provisional application No. 63/336,438, filed on Apr. 29, 2022.

(51) Int. Cl.
*H04N 21/43*  (2011.01)
*H04N 21/2368*  (2011.01)

(52) U.S. Cl.
CPC ... *H04N 21/43072* (2020.08); *H04N 21/2368* (2013.01)

(58) Field of Classification Search
CPC ......... H04N 21/43072; H04N 21/2368; H04N 21/4394; H04N 21/8106; H04N 21/43079
See application file for complete search history.

(56) References Cited

U.S. PATENT DOCUMENTS

| | | | |
|---|---|---|---|
| 11,310,554 B2* | 4/2022 | Eden | H04N 21/41407 |
| 2010/0211400 A1* | 8/2010 | Oh | H04N 21/658 704/500 |
| 2017/0019743 A1 | 1/2017 | Tull | |
| 2018/0329669 A1 | 11/2018 | Becker et al. | |
| 2020/0302948 A1 | 9/2020 | Gossard et al. | |
| 2020/0349230 A1 | 11/2020 | Yoshioka et al. | |
| 2022/0038769 A1 | 2/2022 | Meiyappan et al. | |

FOREIGN PATENT DOCUMENTS

| | | | |
|---|---|---|---|
| EP | 1593272 A1 | 11/2005 | |
| WO | WO-2018/051161 A1 | 3/2018 | |

* cited by examiner

*Primary Examiner* — Oschta I Montoya
(74) *Attorney, Agent, or Firm* — Cesari and McKenna, LLP

(57) ABSTRACT

Systems and methods for playing synchronized audio streams for live broadcasts are described. For example, supplemental audio streams (e.g., extra commentary or sound effects) may be streamed over a packet switched network with a copy (e.g., a reduced bandwidth copy) of a main audio signal from a television broadcast. A user device may synchronize the streamed audio with the audio from a television recorded with a microphone, and play a supplemental audio signal synchronously with the audio from the television. For example, methods may include capturing a first audio signal using a microphone; receiving a second audio signal and a third audio signal using a network interface; determining an estimated delay of the first audio signal relative to the second audio signal; and playing, using a speaker, the third audio signal with an added delay determined based on the estimated delay.

18 Claims, 5 Drawing Sheets

SYNCHRONIZED AUDIO STREAMS FOR LIVE BROADCASTS

RELATED APPLICATION(S)

This application claims priority to U.S. Provisional Patent Application No. 63/336,438, filed Apr. 29, 2022, the entirety of which is incorporated herein by reference.

TECHNICAL FIELD

This disclosure relates to synchronized audio streams for live broadcasts.

BACKGROUND

Cross-correlation of two related signals may be used to estimate a relative delay between the two signals. The cross-correlation function works by summing the product of every frame of each signal and then identifying the peak of the newly created signal. For example, if we have a signal with frame values of [5, 10, −2, 5] and cross correlate it with a signal containing frame values [2, 8, −5, 2] at zero frame offset, the method will return the value: (5*2)+(10*8)+(−2*−5)+(5*2)=110. The value can be compared to the cross-correlation value of the samples at different offsets. The offset where the value produced is the largest is the offset where the signals are most correlated.

SUMMARY

Disclosed herein are implementations of synchronized audio streams for live broadcasts.

In a first aspect, a system is provided that includes a microphone, a speaker, a memory, a processor, and a network interface. The memory stores instructions executable by the processor to cause the system to capture a first audio signal using the microphone; receive, using the network interface, a second audio signal and a third audio signal, wherein the second audio signal is synchronized with the third audio signal; determine an estimated delay of the first audio signal relative to the second audio signal; and play, using the speaker, the third audio signal with an added delay determined based on the estimated delay. In the first aspect, the first audio signal may encode sound played by a television that is presenting a television broadcast and the second audio signal may be copy of audio from the television broadcast that is streamed via a packet switched network. In some implementations, the third audio signal is not encoded by the television broadcast. In the first aspect, the second audio signal may include samples corresponding to periodic windows of time that are separated by windows of time for which no samples are included in the second audio signal. The windows without samples may be longer than the windows with samples. In the first aspect, respective estimates of delay may be determined based on each of the windows with samples. In the first aspect, the second audio signal may be encoded with less frequency bands than the first audio signal. In the first aspect, the estimated delay may be a robust estimate of delay, and the memory may store instructions executable by the processor to cause the system to: determine a set of estimates of a delay of the first audio signal relative to the second audio signal based on a cross-correlation at respective analysis steps within the first audio signal and the second audio signal; determine an average delay and a confidence interval for the set of estimates of the delay; compare the confidence interval to a threshold duration; and, responsive to the confidence interval being less than the threshold duration, determine the robust estimate of delay based on the average delay. In some implementations, the confidence interval is one of 80%, 85%, 90%, or 95%, and the threshold duration is one of 16 milliseconds, 18 milliseconds, 20 milliseconds, 22 milliseconds, or 24 milliseconds. For example, in some implementations, the confidence interval is a 90% confidence interval and the threshold duration is 20 milliseconds. In the first aspect, the respective analysis steps may have overlapping analysis windows. For example, the respective analysis steps may have analysis windows that overlap by half with adjacent analysis steps.

In a second aspect, a method is provided that includes capturing a first audio signal using a microphone; receiving a second audio signal and a third audio signal using a network interface, wherein the second audio signal is synchronized with the third audio signal; determining an estimated delay of the first audio signal relative to the second audio signal; and playing, using a speaker, the third audio signal with an added delay determined based on the estimated delay.

In the second aspect, the first audio signal may encode sound played by a television that is presenting a television broadcast and the second audio signal may be a copy of audio from the television broadcast that is streamed via a packet switched network. In some implementations, the third audio signal is not encoded by the television broadcast. In the second aspect, the second audio signal may include samples corresponding to periodic windows of time that are separated by windows of time for which no samples are included in the second audio signal. For example, the windows without samples may be longer than the windows with samples. In the second aspect, respective estimates of delay may be determined based on each of the windows with samples. In the second aspect, the second audio signal may be encoded with less frequency bands than the first audio signal. In the second aspect, the estimated delay may be a robust estimate of delay, and the method may include: determining a set of estimates of a delay of the first audio signal relative to the second audio signal based on a cross-correlation at respective analysis steps within the first audio signal and the second audio signal; determining an average delay and a confidence interval for the set of estimates of the delay; comparing the confidence interval to a threshold duration; and, responsive to the confidence interval being less than the threshold duration, determining the robust estimate of delay based on the average delay. In some implementations, the confidence interval is one of 80%, 85%, 90%, or 95%, and the threshold duration is one of 16 milliseconds, 18 milliseconds, 20 milliseconds, 22 milliseconds, or 24 milliseconds. For example, in some implementations, the confidence interval is a 90% confidence interval and the threshold duration is 20 milliseconds. In the second aspect, the respective analysis steps may have overlapping analysis windows.

In a third aspect, a non-transitory computer-readable storage medium is provided that includes executable instructions that, when executed by a processor, facilitate performance of operations, including capturing a first audio signal using a microphone; receiving a second audio signal and a third audio signal using a network interface, wherein the second audio signal is synchronized with the third audio signal; determining an estimated delay of the first audio signal relative to the second audio signal; and playing, using a speaker, the third audio signal with an added delay determined based on the estimated delay.

In the third aspect, the first audio signal may encode sound played by a television that is presenting a television broadcast, the second audio signal may be a copy of audio from the television broadcast that is streamed via a packet switched network, and the third audio signal is not encoded by the television broadcast. In the third aspect, the third audio signal may comprise one or more supplemental audio streams corresponding to at least one of commentary on a sporting event, a user selectable soundtrack, or a radio broadcast. In the third aspect, the second audio signal may include samples corresponding to periodic windows of time that are separated by windows of time for which no samples are included in the second audio signal. For example, the windows without samples may be longer than the windows with samples. In the third aspect, respective estimates of delay may be determined based on each of the windows with samples. In the third aspect, the second audio signal may be encoded with less frequency bands than the first audio signal. In the third aspect, the estimated delay may be a robust estimate of delay, and the operations may include: determining a set of estimates of a delay of the first audio signal relative to the second audio signal based on a cross-correlation at respective analysis steps within the first audio signal and the second audio signal; determining an average delay and a confidence interval for the set of estimates of the delay; comparing the confidence interval to a threshold duration; and, responsive to the confidence interval being less than the threshold duration, determining the robust estimate of delay based on the average delay. In some implementations, the confidence interval is one of 80%, 85%, 90%, or 95%, and the threshold duration is one of 16 milliseconds, 18 milliseconds, 20 milliseconds, 22 milliseconds, or 24 milliseconds. For example, in some implementations, the confidence interval is a 90% confidence interval and the threshold duration is 20 milliseconds. In the third aspect, the respective analysis steps may have overlapping analysis windows.

Other aspects and advantages of the invention will become apparent from the following detailed description, taken in conjunction with the accompanying drawings, illustrating the principles of the invention by way of example only.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
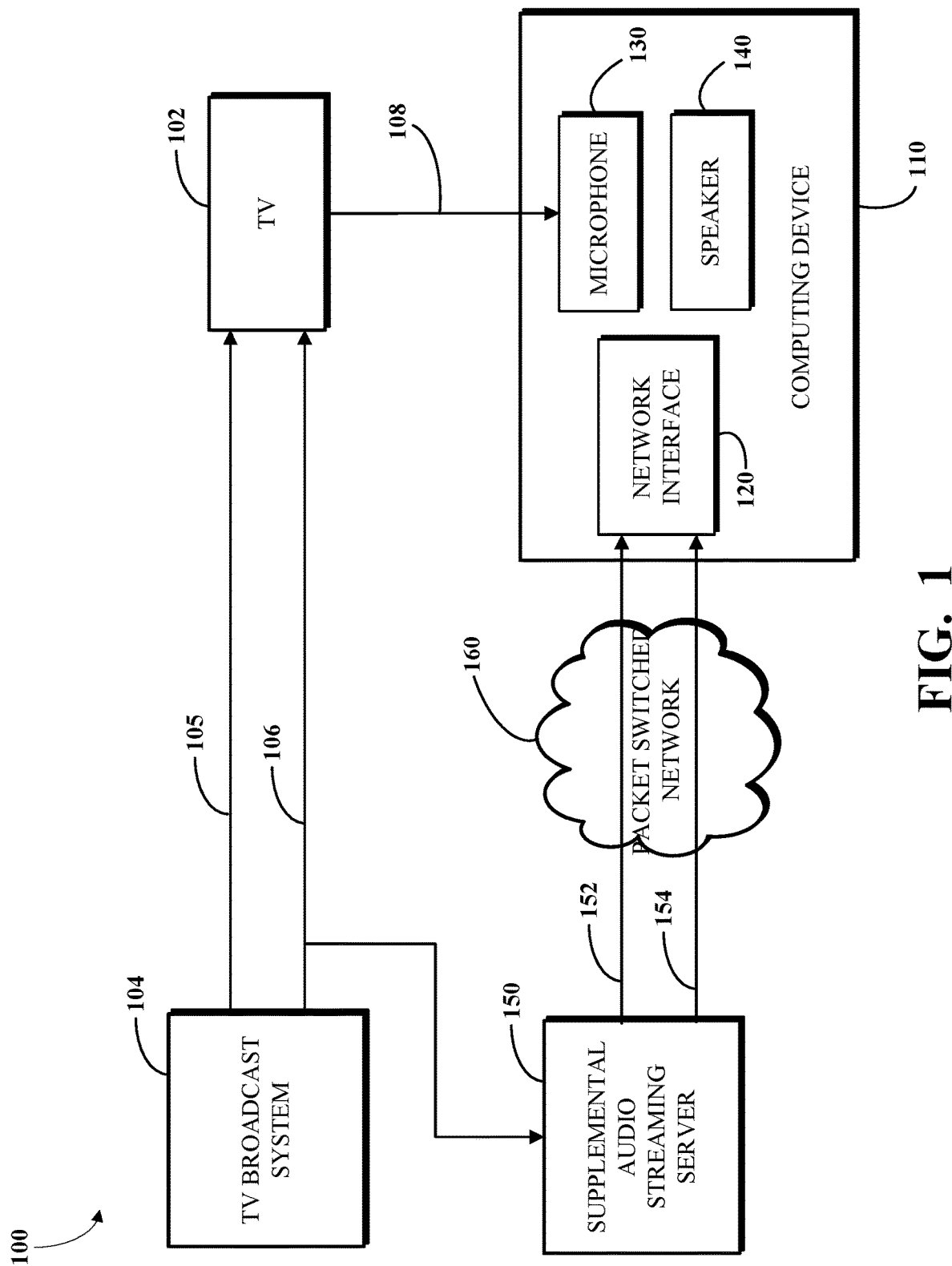
FIG. 1 is a block diagram of an example of a system for delivering synchronized audio streams for live broadcasts.

Systems and methods providing synchronized audio streams for live broadcasts are described. For example, supplemental audio streams (e.g., extra commentary, sound effects, soundtracks, or radio broadcasts) may be streamed over a packet switched network with a copy (e.g., a reduced bandwidth copy) of a main audio signal from a television broadcast. A user device may synchronize the streamed audio with the audio from a television recorded with a microphone, and play a supplemental audio signal synchronously with the audio from the television. For example, cross-correlation analysis of the streamed copy of the main television broadcast audio with the captured audio from the television may be used to estimate the relative delay of the stream audio in relation to the broadcast audio that is being captured. The bandwidth of the copy of the main audio signal may be reduced by time domain and/or frequency domain methods. For example, the copy may omit large windows of samples from the broadcast audio signal between periodic windows of samples that are used to periodically update an estimate of the relative delay between the two audio signals. In some implementations, a reduced set of frequency bands may be included in the copy of the main audio signal that is streamed.

Techniques described herein may be used to facilitate capture of audio at a live event on local servers, that are streamed to a third-party application or directly to the user's computing device time-aligned with a television broadcast of the same event. For example, a televised mixed martial arts event may be supplemented by recording live event audio (e.g., mic'd up coaches or directed microphones recording noise from the action) and then streaming these supplemental audio streams to a mixed martial arts company's server or directly to user computing devices time-aligned to the television broadcast of the event.

Techniques for dynamic latency estimation for audio streams are described below in relation to a real time audio streaming platform that may be configured to take soundboard audio from a live event and streams it to currently present attendees in real time. The real time audio streaming platform may take the audio frames from a sound source and transmit the frames over a wireless network in real time to computing devices (e.g., mobile devices).

One of the challenges with this process centers around the speed of sound. If we consider the atmosphere on a standard day at sea level static conditions, the speed of sound is about 761 mph, or 1100 feet/second. While on paper this sounds fast, comparing it to the speed of network data, this may be quite slow. A common simplification for the speed of sound is for every foot of distance travelled 1 millisecond of latency is added, (e.g., if a listener is 200 ft away from a sound source—like a speaker—they would experience 200 ms of audio latency). However, the real time audio streaming platform may operate at a much faster speed (e.g., under 20 ms) and its speed is only slightly affected by distance. As a result, the farther a listener moves away from a sound source, the more disparate the difference between the platform streaming latency and natural audio latency from the sound source becomes. This may generate a jarring listening experience where the platform audio stream and the live event audio are out of time alignment and create a "slap-back" effect. Because the platform is streaming to attendees at the live event this challenge (i.e., latency discrepancies between the live audio source and the platform stream) may be common. Addressing this latency discrepancy may provide a more enjoyable/enhanced listening experience to users.

Dynamic Latency—Approach and Overview:

There are many ways to approach the issue of time alignment. In the case of a real time audio streaming platform, a goal is to know the approximate distance a listener is from the sound source (e.g., in the case of a concert, the stage). This can be done with geolocation, however inside an arena this is often not particularly accurate due the materials of the building. Instead, one approach is to time align using the audio at the listeners location paired with a reference stream.

Since the baseline latency of the real time audio streaming platform (e.g., ~20 ms) may be known a priori and this latency may not vary significantly over distances less than 1000 ft, the audio traffic received over the wireless network may be used as a reference signal. The surrounding live audio of the listener may be captured using one or more microphones of the user's mobile device and compared to the reference signal to estimate relative phase shift of the two audio signals. This relative phase shift, combined with a known baseline latency of the platform network stream, may be used to accurately estimate the listener's distance from a sound source.

Various techniques may be used for estimating latency of audio signals in a dynamic environment (e.g., a concert where the listener and other objects may be moving) to enable dynamically adjusting a delay of an audio stream played for the listener to synchronize with the live audio the user is experiencing. In some implementations, determining a delay adjustment includes estimating a distance between the listener and a sound source (e.g., speakers). For example, some techniques for estimating the latency include determination of a cross-correlation (CC). For example, some techniques for estimating the latency include determination of an Average Square Difference (ASDF). For example, some techniques for estimating the latency include determination of a peak analysis (PEAK). For example, some techniques for estimating the latency include determination of a generalized cross-correlation with phase transformation (PHAT). For example, some implementations may be implemented in part using the open-source time delay estimation (TDE) comparison library LibTDE. For example, these techniques may be applied to paired stream and listener/user mic samples taken at actual live events and used to estimate the delay between the two samples.

While the Cross-Correlation module of LibTDE is an accurate and useful tool, it makes many assumptions that do not always hold in real world live event streaming situations. For example, past work using LibTDE, have made the following assumptions that do not conform to live event based real world scenarios:

Quiet/Clean Signal-to-Noise ratio (SNR)—Some past work using the Cross Correlation formula assumes comparison in a quiet room. However, in a live event setting there is lots of additional noise which dramatically reduces the SNR.

Precise Microphone Hardware Arrays—high quality audio microphones have been used and placed in an array setting in order to calculate distance. In some implementations, the real time audio streaming platform strives to achieve robust time delay and distance estimation using a single cell phone microphone.

Controlled reference stream—Given the controlled environment of the test, some past work has used the actual sound generation source as the reference signal. The real time audio streaming platform often cannot make this assumption as it would be impractical to wire every listening device to the sound source (e.g., the soundboard of the live event).

Defined signal source—Some past implementations were designed to use a sine wave to determine the latency/distance. The real time audio streaming platform may utilize the live audio at an event and as such cannot take advantage of the clean waveforms that the prior phase shift estimators expect.

Iterative Speed—Some past work using the CC formula is designed to continually run to increase estimation accuracy. However, running such a process on a listener's mobile device may drain the battery far too quickly to be useful.

The limitations listed above may limit the effectiveness of time delay estimation techniques (e.g., using the CC formula) in real world settings. However, by building additional features and calculations around the CC formula, one can create a more robust and accurate time delay estimation (TDE) that is designed to work in a live event, real world situations.

Input parameters for the real time audio streaming platform's TDE (which uses a CC formula) may include:

Cycle: A cycle consists of a length of a stream recording and mic recording from a computing device (e.g., a mobile device) mic or headphone mic. The length of the cycle is defined by the variables below.

Analysis Window Size: The size (e.g., in milliseconds) of the window where the two clips are compared. This window size may be set variably.

Analysis Step Size: The length (e.g., in milliseconds) the analysis window is advanced after an iteration of analysis done by the CC formula. The Step Size may be set variably.

Steps per Cycle: The number of steps of Step Size length that the real time audio streaming platform's TDE will consider when estimating the delay between the two audio clips in the present Cycle. The Steps per Cycle may be set variably.

Partial Steps: The act of breaking the Steps per Cycle analysis into smaller chunks to decrease redundant calculations.

Max Delay: The maximum distance (e.g., in milliseconds) the two samples could be offset from each other. The Max Delay may be set variably.

In some implementations, the time complexity of the cross-correlation may be related linearly to two input variables: max delay and analysis window.

$$O(n)=O(\text{max delay}*\text{analysis window})=O(mw)$$

The CC function also may be repeated for each analysis step in the sample.

$$O(n)=O(mw)*O(\text{cycle length/analysis step})=O(mwL/s)$$

With these definitions in place, we can now describe the real time audio streaming platform's TDE, which uses a CC formula to estimate the delay in a real-world live event scenario using only the platform streaming system and the microphones of a computing device (e.g., a mobile device). The following changes and improvements may be implemented to create a more accurate TDE:

To tackle the poor SNR (limitation #1) where the likelihood for an error in the measurements is the highest, the largest contributor to the noise will be the crowd. Crowd noise closely resembles white noise in that it is mostly random and covers a large portion of the frequency spectrum. This means we will generally see an equal number of mismeasurements above and below the real delay value with the highest concentration at the real delay value. Therefore, to determine if our mean value for these measurements can safely represent the real delay, we can calculate a confidence interval for the sample measurement distribution. This involves averaging the CC formula result of each Analysis Step across the Steps per Cycle (referred to as the Cycle Data Set) and then applying a confidence interval on this Cycle Data Set. The confidence interval may be determined using a standard deviation with a tolerance amount in variability. For example, the confidence interval can be defined as all values in the Cycle Data Set being 90% within 20 ms of variability. This statistical analysis also handles the Precise Hardware (#2) as well as Defined Signal Source (#4) limitation noted above.

To tackle the lack of a Controlled Reference Stream (#3) the TDE utilizes a network stream from the real time audio streaming platform as the reference. Because the baseline latency of the real time audio streaming platform is known, calculations may be adjusted accordingly.

Additional improvements may center around handling Iterative Speed (#5) assumption. Based on the time complexity definition above, it is useful to keep the Max Delay, Analysis Window, Cycle as small as possible and the Analysis Step value as large as possible without negatively impacting estimates. An example, of an iterative process is described below:

An audio sample is taken from both the real time audio streaming platform as well as captured by one or more microphones of the computing devices (e.g., mobile devices). An analysis is then done by defining an Analysis Window. In some implementations, the Analysis Step Size is then set to half the Analysis Window for each iteration. On each iteration, the Analysis Window is passed to the CC formula which produces a delay estimate value. This delay value can be bounded by the Max Delay variable in order to increase the speed of the CC formula (which is done by bounding how many calculations need to be done per Step Size. The Window is then advanced by the length specified by the analysis Step Size (e.g., half of the analysis window) in the next iteration and the delay is calculated again. This process continues until Cycle or Sample has been completely analyzed.

Increasing or decreasing the analysis window, analysis step size, and max delay values may come with trade-offs and, as such, are variably set, allowing the TDE to be optimized differently in different conditions. Increasing the Analysis Window will increase the robustness of the delay calculation between the signals because of the larger number of audio frames or samples used to compute the value, however this will also increase time complexity and reduce the resolution of the measurements which is utilized to provide insight into how the delay estimation changes over time. Analysis Step Size behaves inversely, as increases in this value will reduce time complexity but at the cost of decreasing delay delta resolution. Increasing max delay increases time complexity and increases the chances of error, so it may be better to keep this value as low as possible. It's therefore generally best to keep the Max Delay, Analysis Window, and Cycle length as small as possible and the Analysis Step value as large as possible without negatively impacting the delay estimates.

In some implementations, the TDE analyzes a delay window of –maxDelay to maxDelay, which is necessary in cases where it is unclear which audio signal is delayed. However, in some cases it is known that the audio signal recorded locally by the microphone will be the signal that is delayed. Thus, the minimum of the delay window may be increased to zero, which may again double the speed of the cross-correlation operation.

In some implementations, the real time audio streaming platform's TDE may utilize a lock-free, dynamic programming approach to calculate and store the values from a previous iteration while calculating with audio data that arrives in real time to reduce the time taken by the algorithm by approximately half. Where the steps of the cross-correlation analysis use overlapping windows of audio samples to determine respective delay estimates in the set of delay estimates determined, parallel processing may be employed and the TDE can reduce calculation time by sharing data from partial steps. For example, two steps that use adjacent analysis windows that overlap by half can share a partial result of the cross-correlation calculation corresponding to the overlapping portion of their analysis windows. The TDE may calculate the CC value for an overlapping chunk first, before calculating and combining it with a result for the remainder of the analysis window. This is because while the doing the analysis for the overlapping portion of the analysis window, the remaining data for the next step of the CC analysis data will arrive. Step calculations are done independently and by prioritizing the shared partial step, the TDE may reduce the amount of redundant calculations and therefore time complexity of the TDE calculation. Because the TDE can reuse the partial step from the earlier of the overlapping analysis windows, the only calculation that needs to be done in the next step is for a remainder of the analysis window of the next step.

FIG. 1 is a block diagram of an example of a system 100 for delivering synchronized audio streams for live broadcasts. The system 100 includes a television 102; a television broadcast system 104; a supplemental audio streaming server 150, and a computing device 110 configured to receive the frames of a main audio signal of a television broadcast and a synchronized supplemental audio signal and play the supplemental audio signal synchronously with an audio signal that has propagated from the television 102 to the computing device 110 via sound waves in the air after passing through a television broadcast channel to the television 102. The computing device 110 includes a network interface 120 configured to received data (e.g., via a wireless communication network); a microphone 130; and a speaker 140. In some embodiments, the computing device 110 is communicatively coupled to one or more headphones. The computing device 110 may be configured to estimate the relative delay between audio captured by the microphone 130 and streamed audio signals received from the supplemental audio streaming server 150 via a packet switched network 160. For example, the system 100 may be configured to implement the technique 400 of FIG. 4. For example, the system 100 may be configured to implement the technique 500 of FIG. 5.

The television 102 generates a first audio signal 108 that propagates as sound waves through the air surrounding the television 102 and the computing device 110 (e.g., air in a home of a user of the computing device 110). The television 102 may present a television program including a broadcast video signal 105 and a broadcast audio signal 106, which may be received at the television via a broadcast channel (e.g., using an antenna to receive an over-air television broadcast, via a coaxial cable bearing cable channels, via an HDMI cable or other serial port, or via a packet switched network). For example, the broadcast video signal 105 and the broadcast audio signal 106 may pass through a broadcast network after being generated by a television broadcast system 104. For example, the television broadcast system 104 may be used to record and transmit video and audio of a live event (e.g., a sporting event or a live artistic performance). The first audio signal 108 may include the broadcast audio signal 106 that is being played by the television 102 and noise introduced by the television 102 and/or the surrounding environment.

The supplemental audio streaming server 150 has access to the broadcast audio signal 106 before or shortly after it is transmitted by the television broadcast system 104 through a broadcast network. For example, the supplemental audio streaming server 150 may be collocated with the television broadcast system 104 at a live event and may receive the broadcast audio signal 106 via a wired connection or a short distance wireless communications link. The supplemental audio streaming server 150 transmits a second audio signal 152 that includes a copy of at least portions of the broadcast audio signal 106. The second audio signal 152 is encoded digitally and transmitted via a packet switched network 160 (e.g., the Internet) to one or more user devices, including the computing device 110.

The supplemental audio streaming server 150 also transmits a third audio signal 154 that is synchronized with the second audio signal 152, but not included in the television broadcast. For example, the third audio signal 154 may include extra commentary or sound effects associated with a television broadcast that is not included in the television broadcast (e.g., commentary on a sporting event or a user selectable soundtrack). The third audio signal 154 is encoded digitally and transmitted via the packet switched network 160 to one or more user devices, including the computing device 110. For example, the supplemental audio streaming server 150 may include components of the computing device 300 of FIG. 3. For example, the supplemental audio streaming server 150 may include an audio server that transmits audio data to client devices via the packet switched network 160. In some implementations, the supplemental audio streaming server 150 is configured to multicast audio data of a live event (e.g., a sporting event or musical performance) to personal computing devices (e.g., smartphones or tablets) of users via the packet switched network.

In some implementations, the third audio signal 154 includes at least a portion of a radio broadcast. In one example, the radio broadcast can include audio associated with the television broadcast in one or more different languages. In another example, the radio broadcast can include audio associated with the television broadcast that has been censored (e.g., to remove objectionable language). In another example, the radio broadcast can include audio associated with the television broadcast that has been personalized for one or more users receiving the radio broadcast (e.g., personalized advertisements). As can be appreciated, any or all of the above examples can be combined into one or more radio broadcasts or radio broadcast channels for transmission by the supplemental audio streaming server 150 (e.g., a personalized, Spanish language radio broadcast).

The computing device 110 may be configured to estimate the relative delay between the first audio signal 108 captured by the microphone 130 and the second audio signal 152 received from the supplemental audio streaming server 150 using the network interface 120. The computing device 110 may play the third audio signal 154 from the received from the supplemental audio streaming server 150 using the network interface 120 using a delay based on the estimated delay. For example, the computing device 110 may be a smartphone, a tablet, or a head-mounted display for augmented reality applications. For example, the computing device 110 may include components of the computing device 300 of FIG. 3. In some implementations, a cross-correlation based algorithm may be used to estimate the relative delay between the first audio signal 108 and the second audio signal 152.

In some implementations, the computing device 110 may be configured to receive a third audio signal 154 from the supplemental audio streaming server 150 that is selected by a user of the computing device 110. For example, the computing device 110 can display a list of audio content available from the supplemental audio streaming server 150, such as one or more third audio signals 154 corresponding to, e.g., different soundtracks or radio broadcasts. The user of the computing device 110 can select one of the third audio signals 154 for playback on the computing device 110 and the supplemental audio streaming server 150 can transmit the selected third audio signal 154 to the computing device 110 as described above. By enabling a user to select from a plurality of different third audio signals 154, several technical and operational benefits are realized. For example, content producers and advertisers are no longer limited to generating content in only a single language or they are no longer required to expend the cost and time to produce the content in multiple languages.

The speaker 140 may be integrated with the computing device 110 or the speaker 140 may be part of a separable device that is controlled by the computing device 110. For example, the speaker 140 may be part of an earbud or other headphones that are controlled by the computing device 110 (e.g., controlled via a wired connection through an RJ11 jack or via a wireless Bluetooth connection).

In some implementations, the computing device 110 is configured to capture the first audio signal 108 using the microphone 130; receive, using the network interface 120, a second audio signal 152 and a third audio signal 154, wherein the second audio signal 152 is synchronized with the third audio signal 154; determine an estimated delay of the first audio signal 108 relative to the second audio signal 152; and play, using the speaker 140, the third audio signal 154 with an added delay determined based on the estimated delay. For example, the first audio signal 108 may encode sound played by the television 102 that is presenting a television broadcast and the second audio signal 152 may be a copy of audio from the television broadcast that is streamed via a packet switched network 160. In some implementations, the third audio signal 154 (e.g., supplemental commentary, a specialized soundtrack, or a radio broadcast) is not encoded by the television broadcast. In some implementations, the second audio signal 152 includes samples corresponding to periodic windows of time that are separated by windows of time for which no samples are included in the second audio signal 152. For example, the windows without samples may be longer than the windows with samples. For example, respective estimates of delay may be determined based on each of the windows with samples. In some implementations, the second audio signal 152 is encoded with less frequency bands than the first audio signal 108 (e.g., using a lossy frequency domain compression algorithm). In some implementations, the estimated delay is a robust estimate of delay, and the computing device 110 may be configured to: determine a set of estimates of a delay of the first audio signal relative to the second audio signal based on a cross-correlation (e.g., using the technique 200 of FIG. 2) at respective analysis steps within the first audio signal and the second audio signal; determine an average delay and a confidence interval for the set of estimates of the delay; compare the confidence interval to a threshold duration; and, responsive to the confidence interval being less than the threshold duration, determine the robust estimate of delay based on the average delay. For example, the confidence interval may be a 90% confidence interval and the threshold duration may be 20 milliseconds. The respective analysis steps may have overlapping analysis windows. For example, the respective analysis steps may have analysis windows that overlap by half with adjacent analysis steps. For example, the computing device 110 may be configured to implement the technique 400 of FIG. 4 and/or the technique 500 of FIG. 5.

Figure 2:
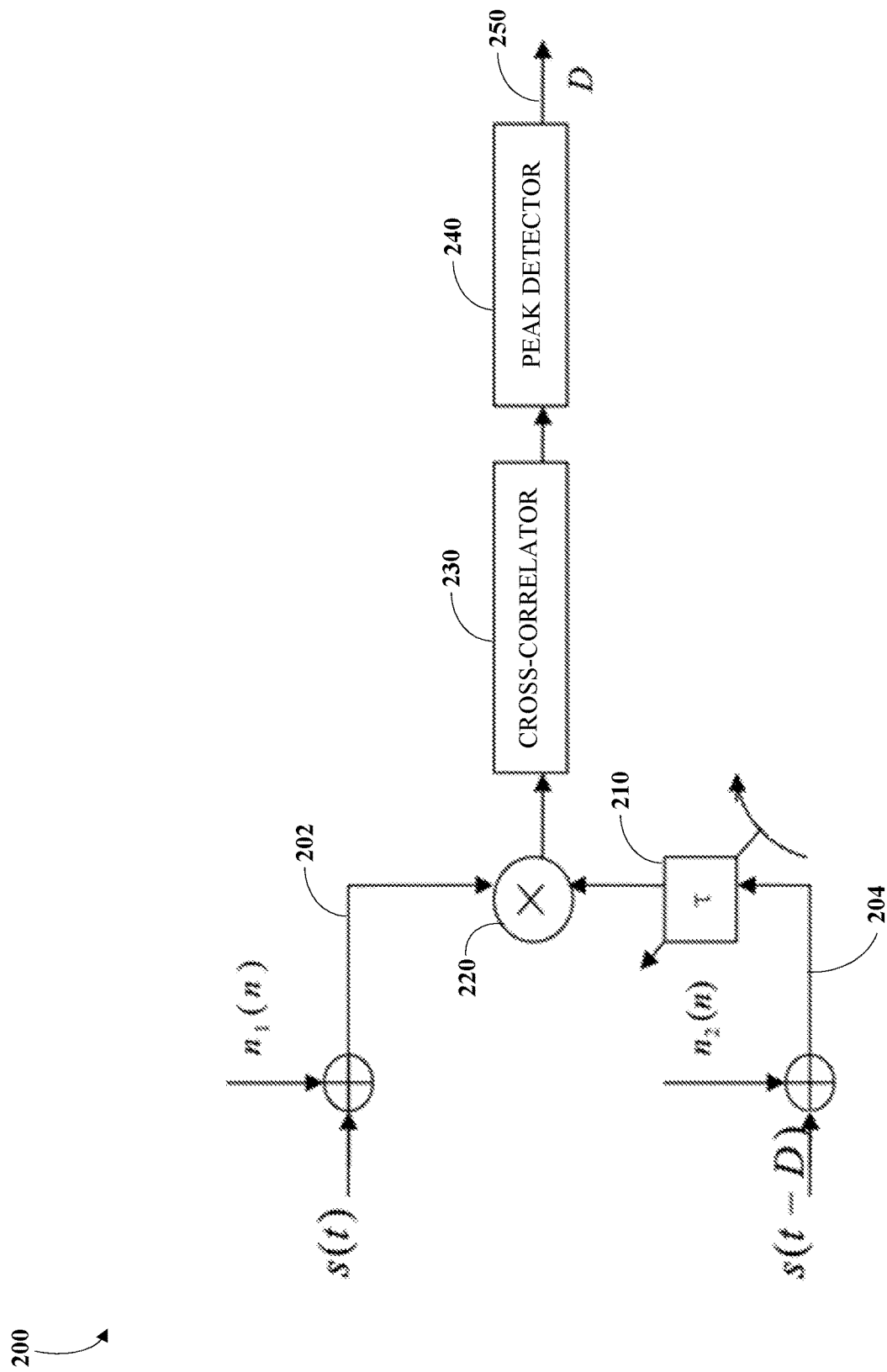
FIG. 2 is a block diagram of an example of a technique using cross-correlation to estimate a delay between two signals over an analysis window.

FIG. 2 is a block diagram of an example of a technique 200 using cross-correlation to estimate a delay between two signals over an analysis window. The technique 200 takes a first audio signal 202 (e.g., an audio signal captured with a local microphone) and a second audio signal 204 (e.g., a streamed audio signal received as frames of samples transmitted via a packet switched network) as inputs and outputs an estimated delay 250 between the two input signals. The input signals 202 and 204 are modeled as time shifted versions of each other with respective additive noise components. The technique 200 uses a variable delay buffer 210 to introduce a phase shift in the second audio signal 204 that can be varied over a range of delays expected for the application that will be searched to find an estimate of the true relative delay (D) of the two audio signals. The first audio signal 202 and the phase shifted second audio signal 204 are passed to a multiplier 220 and the resulting products are passed to a cross-correlator 230 that adds the products to determine cross-correlations at the various phase shifts that are searched. The resulting cross correlations are passed to a peak detector 240 that identifies the phase shift corresponding to the maximum cross-correlation as the estimated delay 250 between the two input signals. In some implementations, the technique 200 may be applied multiple times to different analysis windows of the two input signals 202 and 204 and a set of resulting estimated delays 250 may be statistically analyzed to determine a more robust estimate of the relative delay between the first audio signal 202 and the second audio signal 204.

To reduce the Max Delay variable, a couple of approaches have been built into both the real time audio streaming platform as well as the TDE. One of the most effective ways to improve the speed of the algorithm and reduce measurement errors is by setting the max delay window (the range of possible values the audio could be delayed) to as small a value as feasible. One way to do this is to deliver these values to a client (i.e., a computing device) from the server (e.g., the supplemental audio streaming server 150) as metadata.

Figure 3:
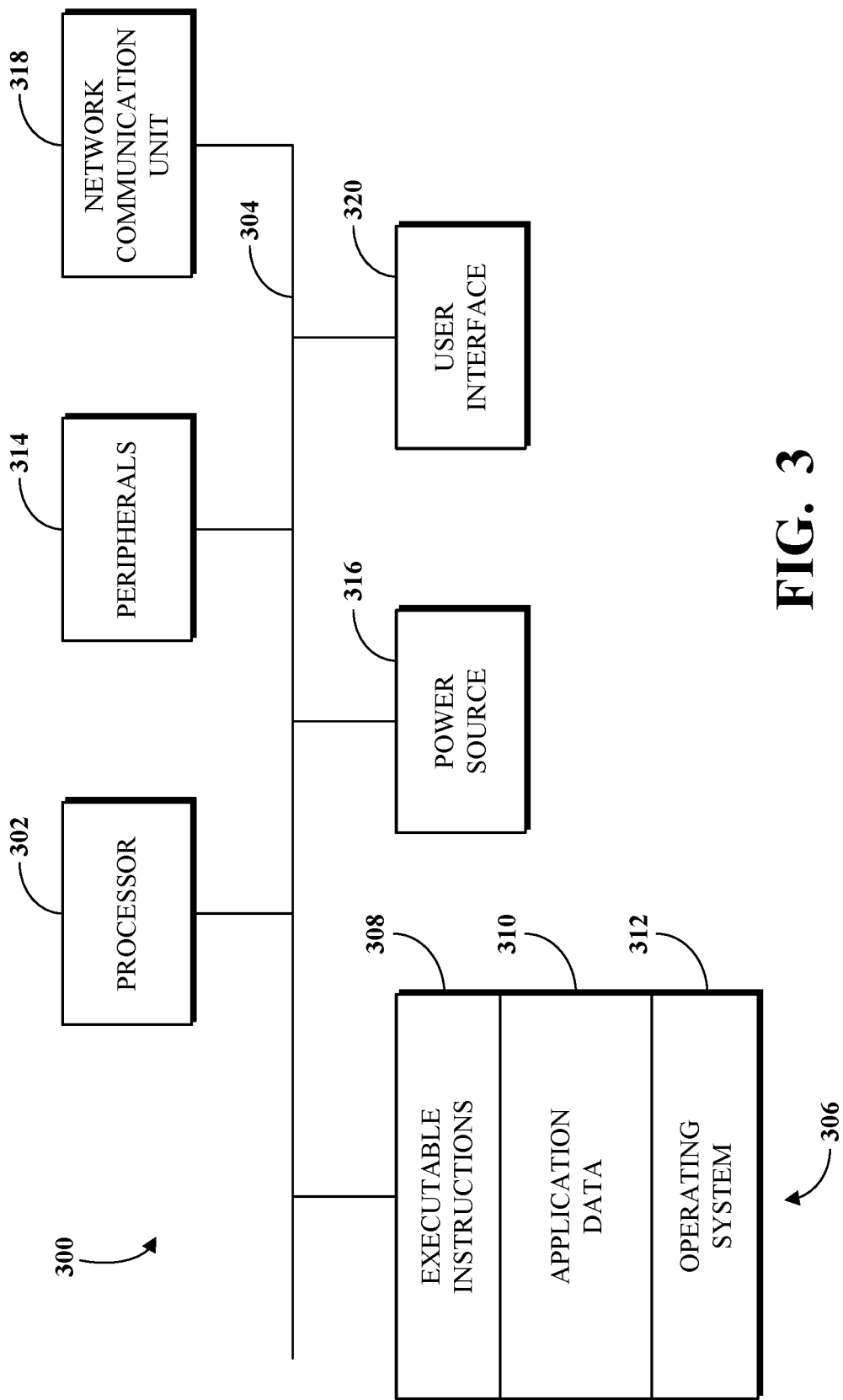
FIG. 3 is a block diagram of an example of an internal configuration of a computing device of the system shown in FIG. 1.

FIG. 3 is a block diagram of an example of an internal configuration of a computing device 300 of the system shown in FIG. 1, such as the supplemental audio streaming server 150 or the computing device 110. For example, a client device and/or a server device can be a computing system including multiple computing devices and/or a single computing device, such as a mobile phone, a tablet computer, a laptop computer, a notebook computer, a desktop computer, a server computer, and/or other suitable computing devices. A computing device 300 can include components and/or units, such as a processor 302, a bus 304, a memory 306, peripherals 314, a power source 316, a network communication unit 318, a user interface 320, other suitable components, and/or any combination thereof.

The processor 302 can be a central processing unit (CPU), such as a microprocessor, and can include single or multiple processors, having single or multiple processing cores. Alternatively, the processor 302 can include another type of device, or multiple devices, now existing or hereafter developed, capable of manipulating or processing information. For example, the processor 302 can include multiple processors interconnected in any manner, including hardwired and/or networked, including wirelessly networked. In some implementations, the operations of the processor 302 can be distributed across multiple physical devices and/or units that can be coupled directly or across a local area or other type of network. In some implementations, the processor 302 can include a cache, or cache memory, for local storage of operating data and/or instructions. The operations of the processor 302 can be distributed across multiple machines, which can be coupled directly or across a local area or other type of network.

The memory 306 can include volatile memory, non-volatile memory, and/or a combination thereof. For example, the memory 306 can include volatile memory, such as one or more DRAM modules such as DDR SDRAM, and non-volatile memory, such as a disk drive, a solid-state drive, flash memory, Phase-Change Memory (PCM), and/or any form of non-volatile memory capable of persistent electronic information storage, such as in the absence of an active power supply. The memory 306 can include another type of device, or multiple devices, now existing or hereafter developed, capable of storing data and/or instructions for processing by the processor 302. The processor 302 can access and/or manipulate data in the memory 306 via the bus 304. Although shown as a single block in FIG. 3, the memory 306 can be implemented as multiple units. For example, a computing device 300 can include volatile memory, such as RAM, and persistent memory, such as a hard drive or other storage. The memory 306 can be distributed across multiple machines, such as network-based memory or memory in multiple machines performing the operations of clients and/or servers.

The memory 306 can include executable instructions 308; data, such as application data 310; an operating system 312; or a combination thereof for immediate access by the processor 302. The executable instructions 308 can include, for example, one or more application programs, which can be loaded and/or copied, in whole or in part, from non-volatile memory to volatile memory to be executed by the processor 302. The executable instructions 308 can be organized into programmable modules and/or algorithms, functional programs, codes, code segments, and/or combinations thereof to perform various functions described herein. For example, the memory 306 may include instructions executable by the processor 302 to cause a system including the computing device 300 to implement the technique 400 of FIG. 4 or the technique 500 of FIG. 5.

The application data 310 can include, for example, user files; database catalogs and/or dictionaries; configuration information for functional programs, such as a web browser, a web server, a database server; and/or a combination thereof. The operating system 312 can be, for example, Microsoft Windows®, Mac OS X®, or Linux®; an operating system for a small device, such as a smartphone or tablet device; or an operating system for a large device, such as a mainframe computer. The memory 306 can comprise one or more devices and can utilize one or more types of storage, such as solid state or magnetic storage.

The peripherals 314 can be coupled to the processor 302 via the bus 304. The peripherals can be sensors or detectors, or devices containing any number of sensors or detectors, which can monitor the computing device 300 itself and/or the environment around the computing device 300. For example, a computing device 300 can contain a geospatial location identification unit, such as a global positioning system (GPS) location unit. As another example, a computing device 300 can contain a temperature sensor for measuring temperatures of components of the computing device 300, such as the processor 302. Other sensors or detectors can be used with the computing device 300, as can be contemplated. In some implementations, a client and/or server can omit the peripherals 314. In some implementations, the power source 316 can be a battery, and the computing device 300 can operate independently of an external power distribution system. Any of the components of the computing device 300, such as the peripherals 314 or the power source 316, can communicate with the processor 302 via the bus 304. Although depicted here as a single bus, the bus 304 can be composed of multiple buses, which can be connected to one another through various bridges, controllers, and/or adapters.

The network communication unit 318 can also be coupled to the processor 302 via the bus 304. In some implementations, the network communication unit 318 can comprise one or more transceivers. The network communication unit 318 provides a connection or link to a network via a network interface, which can be a wired network interface, such as Ethernet, or a wireless network interface. For example, the computing device 300 can communicate with other devices via the network communication unit 318 and the network interface using one or more network protocols, such as Ethernet, TCP, IP, power line communication (PLC), WiFi, infrared, GPRS, GSM, CDMA, TDMA, UMTS, or other suitable protocols.

A user interface 320 can include a display; a positional input device, such as a mouse, touchpad, touchscreen, or the like; a keyboard; and/or any other human and machine interface devices. The user interface 320 can be coupled to the processor 302 via the bus 304. Other interface devices that permit a user to program or otherwise use the computing device 300 can be provided in addition to or as an alternative to a display. In some implementations, the user interface 320 can include a display, which can be a liquid crystal display (LCD), a cathode-ray tube (CRT), a light emitting diode (LED) display (e.g., an OLED display), or other suitable display. The user interface 320 may include an audio driver (e.g., a speaker) configured to convert electronic audio data to sound in medium (e.g., air). For example, a speaker of the user interface 320 may be used to play audio data (e.g., encoding music or speech signals). In some embodiments, the computing device 300 is communicatively coupled to one or more headphones. For example, in some embodiments, the one or more headphones may be used to play audio signals.

Figure 4:
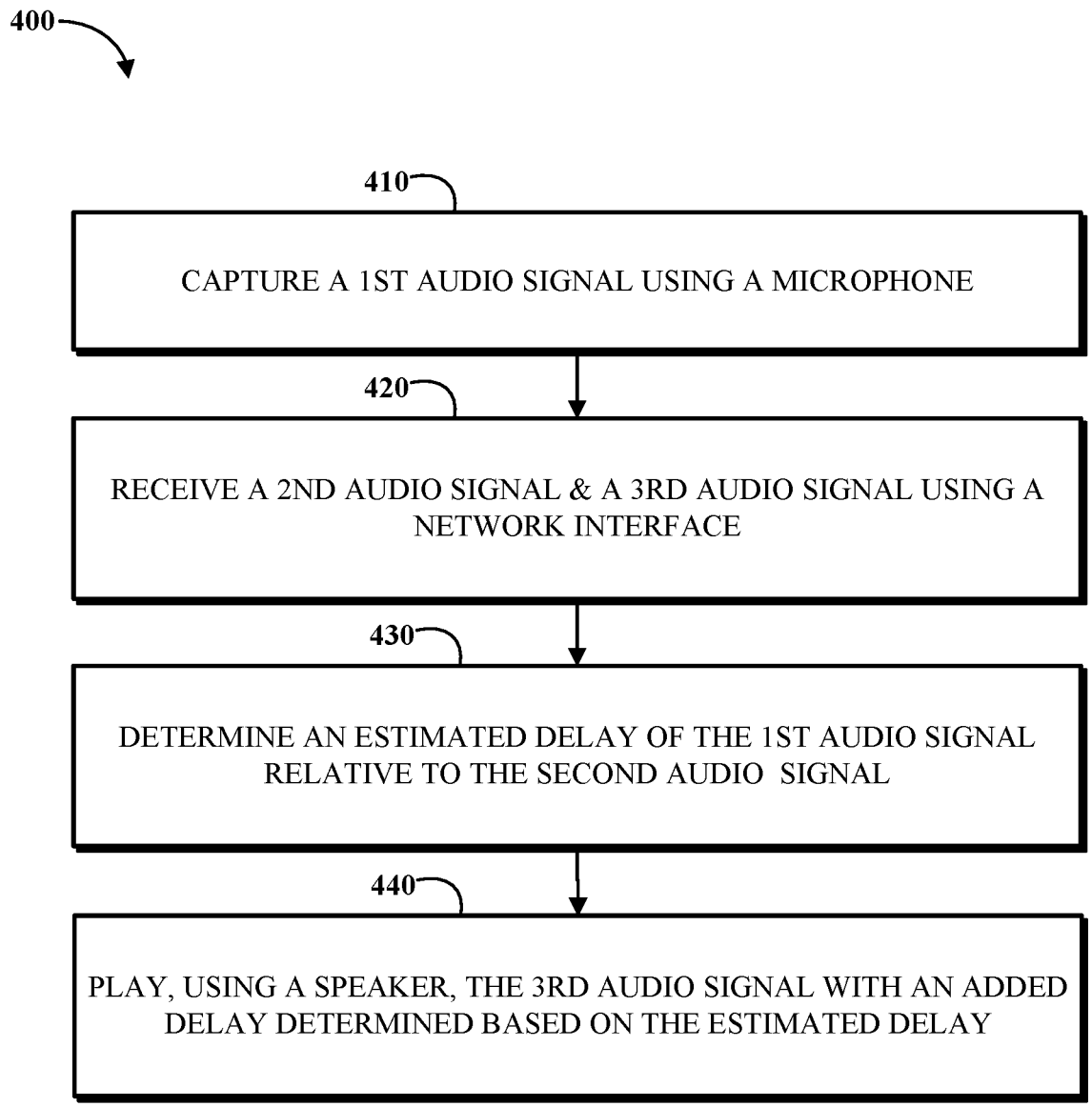
FIG. 4 is a flowchart illustrating an example of a technique for presenting synchronized audio streams for live broadcasts.

FIG. 4 is a flowchart illustrating an example of a technique 400 for presenting synchronized audio streams for live broadcasts. The technique 400 includes capturing 410 a first audio signal using a microphone; receiving 420 a second audio signal and a third audio signal using a network interface; determining 430 an estimated delay of the first audio signal relative to the second audio signal; and playing 440, using a speaker, the third audio signal with an added delay determined based on the estimated delay. For example, the technique 400 may be implemented by the computing device 110 of FIG. 1. For example, the technique 400 may be implemented by the computing device 300 of FIG. 3.

The technique 400 includes capturing 410 a first audio signal using a microphone. For example, the microphone may be integrated in a cellphone, a tablet, or a head-mounted display of a user who is watching a television (e.g., the television 102). For example, the first audio signal may be sampled at 44.1 kHz and encoded in a pulse code modulation format for comparison with the second audio signal. The first audio signal may propagate as sound waves through the air before being captured 410 using the microphone. The first audio signal may include a broadcast audio signal (e.g., the broadcast audio signal 106) that is being played by a television and noise introduced by the television and/or the surrounding environment. For example, the broadcast audio signal and an associated broadcast video signal may pass through a broadcast network after being generated by a television broadcast system. For example, the first audio signal may include audio of a live event (e.g., a sporting event or a live artistic performance) that has been recorded and transmitted by a television broadcast system.

The technique 400 includes receiving 420 a second audio signal and a third audio signal using a network interface. The second audio signal may be synchronized with the third audio signal. For example, the network interface (e.g., the network interface 120) may be a WiFi interface. For example, the second audio signal and the third audio signal may be received as sequences of frames of audio data (e.g., encoding music or speech signals). In some implementations, the first audio signal encodes sound played by a television that is presenting a television broadcast and the second audio signal is a copy of audio from the television broadcast that is streamed via a packet switched network. For example, the second audio signal may include a copy of at least portions of a broadcast audio signal that is included in the first audio signal. The second audio signal may be encoded digitally and transmitted via a packet switched network (e.g., the Internet) to one or more user devices, including a computing device controlling the microphone and the speaker. The third audio signal may be a supplementary audio signal that synchronized with the second audio signal. In some implementations, the third audio signal is not encoded by the television broadcast. For example, the third audio signal may include extra commentary or sound effects associated with a television broadcast that is not included in the television broadcast (e.g., commentary on a sporting event, a user selectable soundtrack, or a radio broadcast). The second audio signal may be a reduced bandwidth copy of a broadcast audio signal occurring in the first audio signal. The second audio signal may use just enough bandwidth to facilitate estimation of a relative phase or delay between the first audio signal and the second audio signal. In some implementations, the second audio signal includes samples corresponding to periodic windows of time that are separated by windows of time for which no samples are included in the second audio signal, and wherein the windows without samples are longer than the windows with samples. For example, respective estimates of delay may be determined based on each of the windows with samples. In some implementations, the second audio signal is encoded with less frequency bands than the first audio signal (e.g., using a lossy frequency domain encoding algorithm).

The technique 400 includes determining 430 an estimated delay of the first audio signal relative to the second audio signal. In some implementations, the estimated delay is determined 430 based on a cross-correlation analysis of the first audio signal and the second audio signal. For example, the technique 500 of FIG. 5 may be implemented to determine 430 the estimated delay of the first audio signal relative to the second audio signal.

The technique 400 includes playing 440, using a speaker, the third audio signal with an added delay determined based on the estimated delay. For example, the added delay may be equal to the estimated delay. For example, the added delay may be a sum of estimated delay and a known relative delay between the second audio signal and the third audio signal. In some implementations, the added delay is offset from the estimated delay by known or estimated delays through the computing device's recording or playout pathways. In some implementations, the added delay is determined based on the estimated delay to produce a desired sound effect. For example, the added delay may be adjusted based on other factors, such as user feedback. The speaker may be integrated with a computing device implementing the technique 400 or the speaker may be part of a separable device that is controlled by the computing device. For example, the speaker may be part of an earbud or other headphones that are controlled by the computing device (e.g., controlled via a wired connection or via wireless Bluetooth connection).

Figure 5:
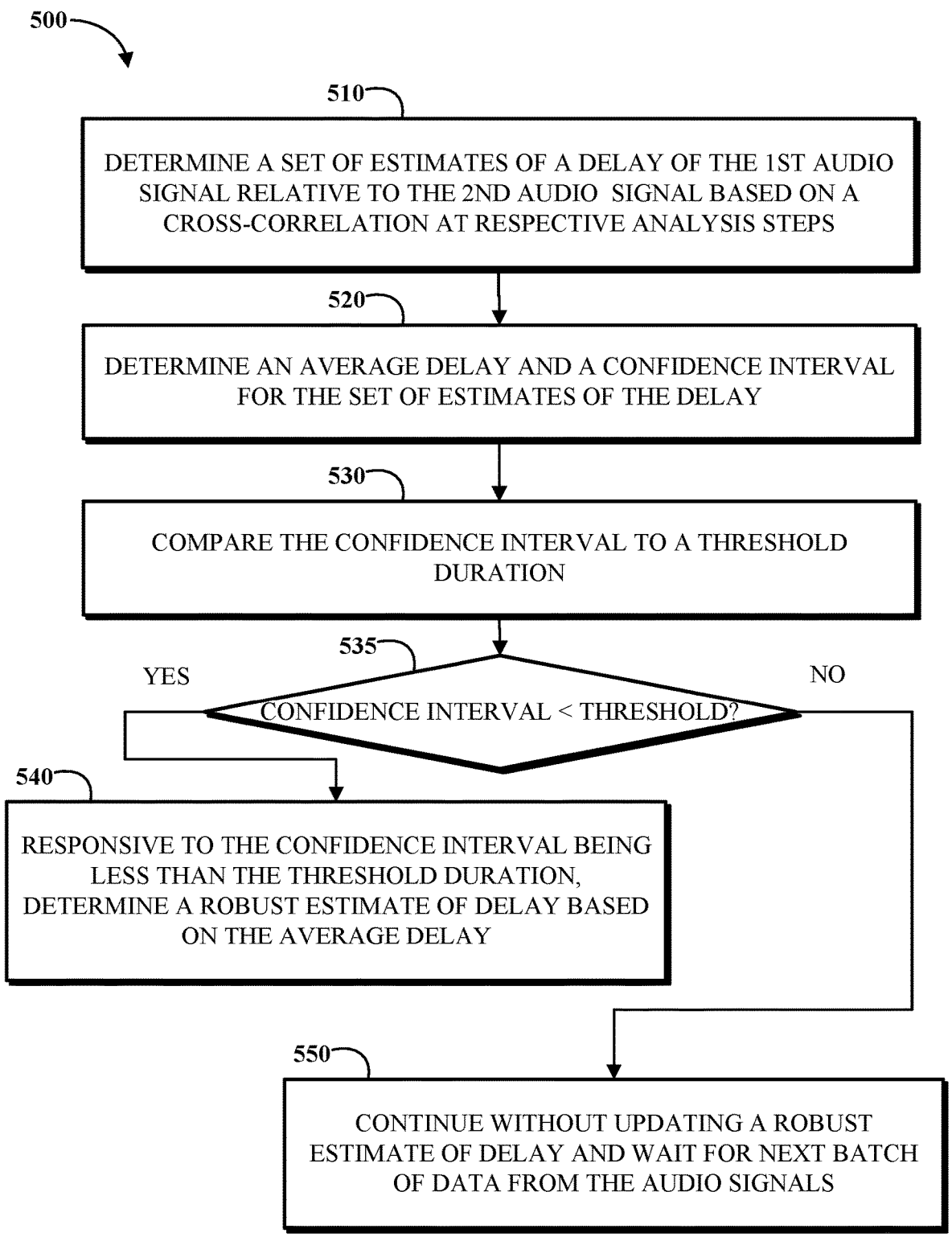
FIG. 5 is a flowchart illustrating an example of a technique for dynamic latency estimation for audio streams.

FIG. 5 is a flowchart illustrating an example of a technique 500 for dynamic latency estimation for audio streams. The estimated delay determined 430 as part of the technique 400 may be a robust estimate of delay. The technique 500 includes determining 510 a set of estimates of a delay of the first audio signal relative to the second audio signal based on a cross-correlation at respective analysis steps within the first audio signal and the second audio signal; determining 520 an average delay and a confidence interval for the set of estimates of the delay; and comparing 530 the confidence interval to a threshold duration. If, at 535, the confidence interval is less than the threshold duration, then the technique 500 includes, responsive to the confidence interval being less than the threshold duration, determining 540 the robust estimate of delay based on the average delay. If, at 535, the confidence interval is greater than the threshold duration, then the technique 500 includes continuing 550 without updating a robust estimate of delay and wait for a next batch of data from the first audio signal and the second audio signal. For example, the technique 500 may be implemented by the computing device 110 of FIG. 1. For example, the technique 500 may be implemented by the computing device 300 of FIG. 3.

The technique 500 includes determining 510 a set of estimates of a delay of the first audio signal relative to the second audio signal based on a cross-correlation at respective analysis steps within the first audio signal and the second audio signal. For example, sets of audio samples from the first audio signal and the second audio may be grouped into different analysis windows to be used in respective analysis steps that determine a respective estimate of delay on the set of estimates of the delay. Together these analysis windows may span a cycle of the two audio signals. In some implementations, the respective analysis steps have overlapping analysis windows. For example, the respective analysis steps have analysis windows that overlap by half with adjacent analysis steps. In an example, the analysis windows for each analysis step may be 2 seconds long and the step size may be 1 second long, so that adjacent analysis windows overlap by half or 1 second. For example, 5 analysis steps per cycle may be used, so that a total of 2*5−4=6 seconds of audio data from each of the first audio signal and the second audio signal are used in a cycle. For each analysis step, a cross-correlation analysis may be performed to determine a respective estimate of the delay in the set of estimates of the delay. For example, a phase shift between the two audio signals that maximizes the cross-correlation over the analysis window may be found and used as the respective estimate of the delay for the analysis step. For example, the technique 200 of FIG. 2 may be implemented to perform an analysis step and determine the respective estimate of the delay for the analysis step. In some implementations, the range of phase shifts searched during an analysis step is limited based on out-of-band information about the range of possible relative delays between the two audio signals, which may serve to reduce the computation complexity and prevent some types of errors. Information about the range of possible relative delays may be received from the access point. In some implementations, a lock-free, dynamic programming approach may be used to perform an analysis step that generates partial results corresponding to the overlapping portions of two analysis windows, which can be stored and reused in in the later of the two analysis steps to reduce computational complexity further.

The technique 500 includes determining 520 an average delay and a confidence interval for the set of estimates of the delay. This statistical analysis applied to the set of estimates of delay for a cycle may suppress noise and improve the robustness of the final estimate of the relative delay of the first audio signal and the second audio signal. In some implementations, the confidence interval is one of 80%, 85%, 90%, or 95%, and the threshold duration is one of 16 milliseconds, 18 milliseconds, 20 milliseconds, 22 milliseconds, or 24 milliseconds. For example, in some implementations, the confidence interval is a 90% confidence interval and the threshold duration is 20 milliseconds.

The technique 500 includes comparing 530 the confidence interval to a threshold duration. For example, the threshold duration may be 20 milliseconds.

At step 535, if the confidence interval is less than the threshold, then the technique 500 includes, responsive to the confidence interval being less than the threshold duration, determining 540 the robust estimate of delay based on the average delay. In some implementations, the added delay is equal to the average delay. In some implementations, the added delay is offset from the average delay by known or estimated delays through the computing device's recording or playout pathways. In some implementations, the added delay is determined based on the average delay to produce a desired sound effect.

At step 535, if the confidence interval is not less than the threshold, then the technique 500 includes, continuing 550 without updating a robust estimate of delay and wait for a next batch of data from the first audio signal and the second audio signal. For example, a next batch of data may correspond to a next window of samples of the second audio signal, where the second audio signal may include only short bursts of samples to facilitate periodic delay estimation.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
a microphone;
a speaker;
a network interface;
a memory; and
a processor, wherein the memory stores instructions executable by the processor to cause the system to:
capture a first audio signal using the microphone;
receive, using the network interface, a second audio signal and a third audio signal, wherein the second audio signal is synchronized with the third audio signal and the second audio signal includes samples corresponding to periodic windows of time that are separated by windows of time for which no samples are included in the second audio signal, and wherein the windows without samples are longer than the windows with samples;
determine an estimated delay of the first audio signal relative to the second audio signal; and
play, using the speaker, the third audio signal with an added delay determined based on the estimated delay.

2. The system of claim 1, wherein the first audio signal encodes sound played by a television that is presenting a television broadcast, the second audio signal is a copy of audio from the television broadcast that is streamed via a packet switched network, and the third audio signal is not encoded by the television broadcast.

3. The system of claim 2, wherein the third audio signal comprises one or more supplemental audio streams corresponding to at least one of commentary on a sporting event, a user selectable soundtrack, or a radio broadcast.

4. The system of claim 1, wherein respective estimates of delay are determined based on each of the windows with samples.

5. The system of claim 1, wherein the second audio signal is encoded with less frequency bands than the first audio signal.

6. The system of claim 1, wherein the estimated delay is a robust estimate of delay, and the memory stores instructions executable by the processor to cause the system to:
determine a set of estimates of a delay of the first audio signal relative to the second audio signal based on a cross-correlation at respective analysis steps within the first audio signal and the second audio signal;
determine an average delay and a confidence interval for the set of estimates of the delay;
compare the confidence interval to a threshold duration; and
responsive to the confidence interval being less than the threshold duration, determine the robust estimate of delay based on the average delay.

7. The system of claim 6, in which the confidence interval is a 90% confidence interval and the threshold duration is 20 milliseconds.

8. The system of claim 6, in which the respective analysis steps have overlapping analysis windows.

9. The system of claim 8, in which the respective analysis steps have analysis windows that overlap by half with adjacent analysis steps.

10. A method comprising:
capturing a first audio signal using a microphone;
receiving a second audio signal and a third audio signal using a network interface, wherein the second audio signal is synchronized with the third audio signal and the second audio signal includes samples corresponding to periodic windows of time that are separated by windows of time for which no samples are included in the second audio signal, and wherein the windows without samples are longer than the windows with samples;
determining an estimated delay of the first audio signal relative to the second audio signal; and
playing, using a speaker, the third audio signal with an added delay determined based on the estimated delay.

11. The method of claim 10, wherein the first audio signal encodes sound played by a television that is presenting a television broadcast, the second audio signal is a copy of audio from the television broadcast that is streamed via a packet switched network, and the third audio signal is not encoded by the television broadcast.

12. The method of claim 11, wherein the third audio signal comprises one or more supplemental audio streams corresponding to at least one of commentary on a sporting event, a user selectable soundtrack, or a radio broadcast.

13. The method of claim 10, wherein respective estimates of delay are determined based on each of the windows with samples.

14. The method of claim 10, wherein the second audio signal is encoded with less frequency bands than the first audio signal.

15. The method of claim 10, wherein the estimated delay is a robust estimate of delay, comprising:
determining a set of estimates of a delay of the first audio signal relative to the second audio signal based on a cross-correlation at respective analysis steps within the first audio signal and the second audio signal;
determining an average delay and a confidence interval for the set of estimates of the delay;
comparing the confidence interval to a threshold duration; and
responsive to the confidence interval being less than the threshold duration, determining the robust estimate of delay based on the average delay.

16. The method of claim 15, in which the confidence interval is a 90% confidence interval and the threshold duration is 20 milliseconds.

17. The method of claim 15, in which the respective analysis steps have overlapping analysis windows.

18. A non-transitory computer-readable storage medium that includes executable instructions that, when executed by a processor, facilitate performance of operations, including:
capturing a first audio signal using a microphone;
receiving a second audio signal and a third audio signal using a network interface, wherein the second audio signal is synchronized with the third audio signal and the second audio signal includes samples corresponding to periodic windows of time that are separated by windows of time for which no samples are included in the second audio signal, and wherein the windows without samples are longer than the windows with samples;
determining an estimated delay of the first audio signal relative to the second audio signal; and
playing, using a speaker, the third audio signal with an added delay determined based on the estimated delay.

* * * * *